US012695236B2

(12) United States Patent
Nakano et al.

(10) Patent No.: US 12,695,236 B2
(45) Date of Patent: Jul. 28, 2026

(54) CONNECTOR

(71) Applicant: YAZAKI CORPORATION, Tokyo (JP)

(72) Inventors: Katsuya Nakano, Makinohara (JP); Yusuke Tsutagawa, Makinohara (JP); Koki Tokumoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 336 days.

(21) Appl. No.: 18/645,457

(22) Filed: Apr. 25, 2024

(65) Prior Publication Data

US 2024/0364045 A1 Oct. 31, 2024

(30) Foreign Application Priority Data

Apr. 28, 2023 (JP) ................................ 2023-074223

(51) Int. Cl.

| | |
|---|---|
| ***H01R 13/506*** | (2006.01) |
| ***H01R 13/52*** | (2006.01) |
| ***H01R 13/639*** | (2006.01) |

(52) U.S. Cl.

CPC ....... *H01R 13/506* (2013.01); *H01R 13/5205* (2013.01); *H01R 13/639* (2013.01)

(58) Field of Classification Search

CPC .............. H01R 13/506; H01R 13/5205; H01R 13/639; H01R 12/7058

USPC ................................ 439/676, 157, 587, 589

See application file for complete search history.

(56) References Cited

U.S. PATENT DOCUMENTS

| | | | | |
|---|---|---|---|---|
| 5,330,362 | A * | 7/1994 | Ito | H01R 13/6271 439/157 |
| 6,089,897 | A * | 7/2000 | Boussairy | H01R 13/635 439/157 |
| 2004/0038569 | A1 | 2/2004 | Yamaoka et al. | |
| 2004/0038588 | A1* | 2/2004 | Bernardi | G02B 6/3879 439/587 |
| 2014/0377986 | A1 | 12/2014 | Endo et al. | |
| 2015/0072542 | A1 | 3/2015 | Hara | |

FOREIGN PATENT DOCUMENTS

| | | | |
|---|---|---|---|
| JP | 2004-79483 | A | 3/2004 |
| JP | 2013-145706 | A | 7/2013 |
| JP | 2013-239414 | A | 11/2013 |

* cited by examiner

*Primary Examiner* — Gary F Paumen

(74) *Attorney, Agent, or Firm* — KENEALY VAIDYA LLP

(57) ABSTRACT

A connector includes a housing fitted to a mating connector, and a spring unit that is provided in the housing and generates a biasing force along a connection direction with the mating connector, in which the spring unit includes a spring formed along the connection direction and accommodated in an accommodation chamber with an inlet opened and a back side closed, a spring cover that has a cylindrical shape with one end opened and another end closed, and is accommodated in the accommodation chamber so as to cover the spring with an open end portion facing the back side of the accommodation chamber, and a packing that is attached to an outer periphery of the spring cover and shuts off water between the spring cover and the accommodation chamber.

4 Claims, 9 Drawing Sheets

CONNECTOR

CROSS-REFERENCE TO RELATED APPLICATION(S)

The present application claims priority to and incorporates by reference the entire contents of Japanese Patent Application No. 2023-074223 filed in Japan on Apr. 28, 2023.

BACKGROUND OF THE INVENTION

1. Field of the Invention

The present invention relates to a connector.

2. Description of the Related Art

Conventionally, as a connector, for example, as described in Japanese Patent Application Laid-open No. 2004-079483, there is known a connector that connects a male housing and a female housing, in which a coiled spring is incorporated in the female housing. The spring performs biasing in a direction of separating the female housing and the male housing.

There is room for improvement in this connector in that water shutoff performance for the spring may be insufficient. That is, in the connector described above, the spring is provided inside the female housing, but there is a possibility that water enters an arrangement position of the spring from a gap between the female housing and the male housing. It is therefore desired to improve the water shutoff performance for the spring.

SUMMARY OF THE INVENTION

Therefore, an object of the present invention is to provide a connector that improves water shutoff performance for a spring provided in a housing.

In order to achieve the above mentioned object, a connector according to one aspect of the present invention includes a housing that is fitted to a mating connector; and a spring unit that is provided in the housing and generates a biasing force along a connection direction with the mating connector, wherein the spring unit includes a spring formed along the connection direction and accommodated in an accommodation chamber with an inlet opened and a back side closed, a spring cover that has a cylindrical shape with one end opened and another end closed, and is accommodated in the accommodation chamber so as to cover the spring with an open end portion facing the back side of the accommodation chamber, and a packing that is attached to an outer periphery of the spring cover and shuts off water between the spring cover and the accommodation chamber.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that the present invention is not limited by this embodiment. In addition, constituent elements in the following embodiment include constituent elements that can be easily replaced by those skilled in the art or constituent elements that are substantially the same.

Embodiment

The present embodiment relates to a connector. In the following description, among a first direction, a second direction, and a third direction intersecting each other, the first direction is referred to as a "connection direction X", the second direction is referred to as a "width direction Y", and the third direction is referred to as a "height direction Z". Here, the connection direction X, the width direction Y, and the height direction Z are orthogonal to each other. The connection direction X corresponds to a connection direction, a fitting direction, and a separation direction of a connector and a mating connector. The width direction Y and the height direction Z correspond to an intersecting direction that intersects the connection direction X. Each of the directions used in the following description represents a direction in a state in which each part is assembled to each other unless otherwise specified. The term "orthogonal" as used herein includes substantially orthogonal.

Figure 1:
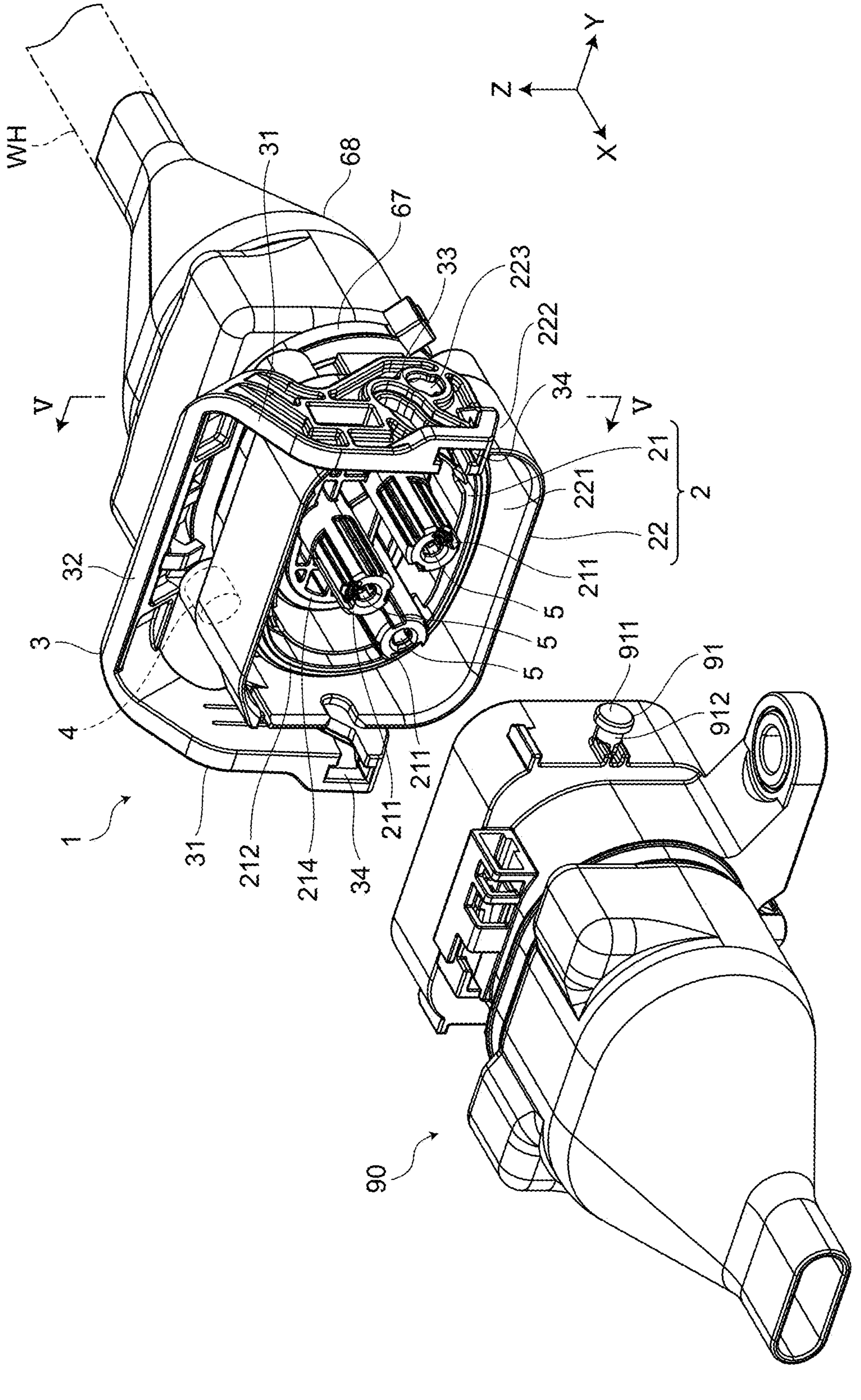
FIG. 1 is a perspective view of a connector according to an embodiment.
Figure 2:
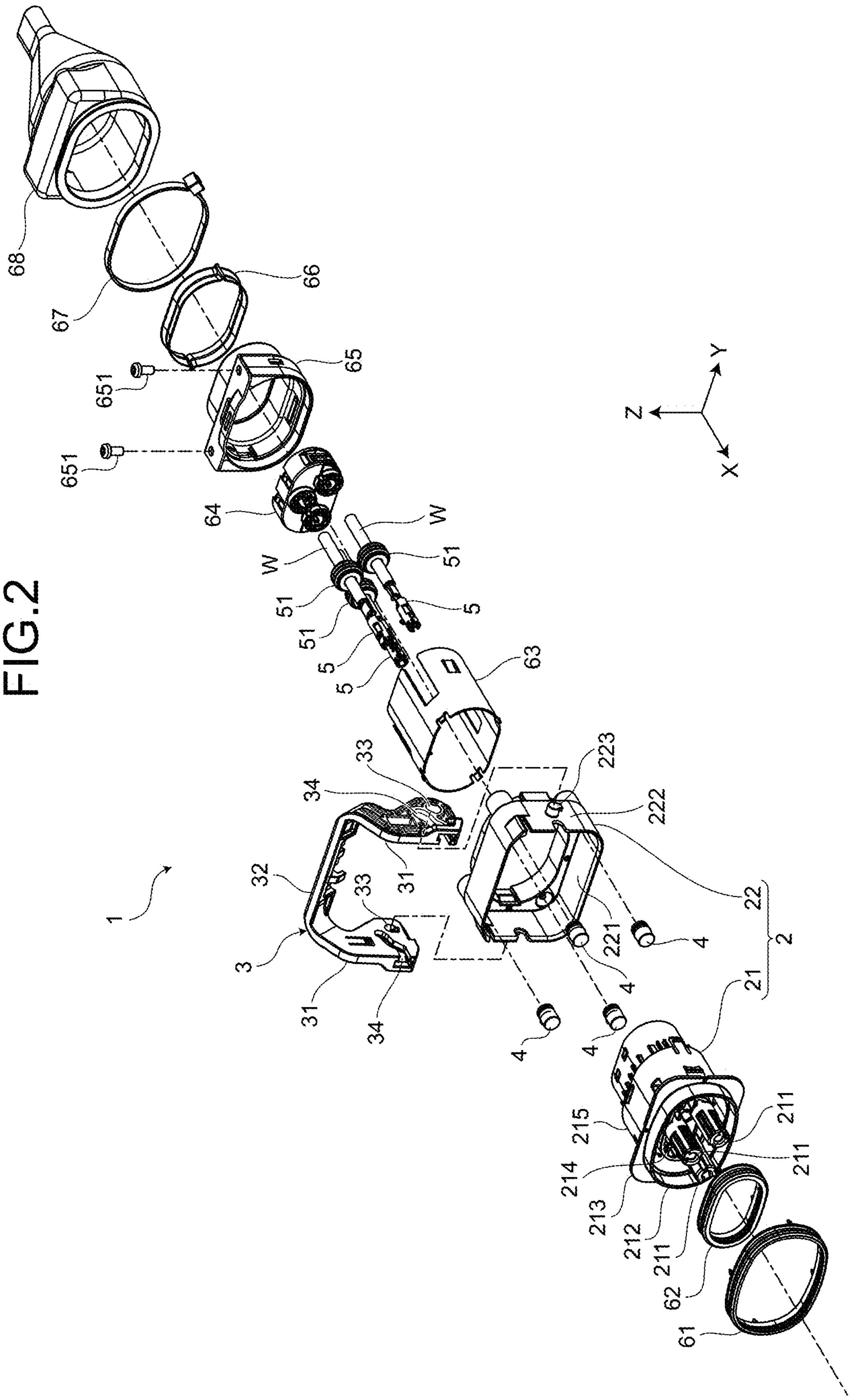
FIG. 2 is an exploded perspective view of the connector according to the embodiment.

As illustrated in FIGS. 1 and 2, a connector 1 is a lever-type connector used for connection with a mating connector 90, and includes a housing 2, a lever 3, and a spring unit 4. The connector 1 is mounted on a vehicle, for example, and is used as a component of a wire harness WH. For example, the connector 1 is a male connector, and the mating connector 90 is a female connector.

The housing 2 is a member that accommodates and holds a terminal 5, and includes, for example, an inner housing 21 and an outer housing 22. The inner housing 21 is a member that holds the terminal 5, and is provided inside the connector 1. The outer housing 22 is provided outside the inner housing 21 and is formed to cover a periphery of a tip of the terminal 5. The outer housing 22 has a cylindrical shape and forms an opening 221 that opens to the mating connector 90. The outer housing 22 may function as a cover, a casing, a shield cover, or a shield shell in the connector 1.

The inner housing 21 forms a terminal storage 211 protruding toward the mating connector 90. The terminal storage 211 is a cylindrical part having an open front end, and accommodates the terminal 5 therein. The terminal storage 211 is formed in accordance with the number of terminals 5 to be installed, and for example, three terminal storages 211 are formed for three terminals 5. The terminal 5 is connected to an electric wire W, and a ring-shaped seal member 51 is attached to the electric wire W.

The inner housing 21 has a cylinder 212 at a distal end part closer to the mating connector 90. The cylinder 212 is a cylindrical part having an elliptical cross section or an oval cross section, covers a periphery of the terminal storage 211, and defines an installation space of the terminal storage 211. A flange 213 is formed on an outer periphery of the cylinder 212. The flange 213 is a plate member formed in a direction intersecting the connection direction X with the mating connector 90, has, for example, a rectangular shape or a substantially rectangular shape, and is provided so as to protrude to outside of the cylinder 212. A packing 61 is attached to an outer periphery of a tip of the cylinder 212. The packing 61 is a water shutoff member that shuts off water between the inner housing 21 and the mating connector 90. A small cylinder 214 is formed inside the cylinder 212. The small cylinder 214 is a part that covers a periphery of a proximal end portion of the terminal storage 211 inside the cylinder 212. A packing 62 is attached to an outer periphery of the small cylinder 214. The packing 62 is a water shutoff member that shuts off water between the inner housing 21 and the mating connector 90.

The inner housing 21 accommodates a shield member 63 and a rear holder 64. The shield member 63 is a cylindrical body that covers the electric wire W in the inner housing 21, and includes, for example, a metal material or the like. The rear holder 64 is attached to the inner housing 21 and holds the seal member 51. For example, the rear holder 64 is provided so as to penetrate the electric wire W, and is attached to the inner housing 21 while holding the seal member 51. The rear holder 64 is configured to be dividable along, for example, the connection direction X in order to facilitate penetration of a plurality of electric wires W.

A rear shield 65 and a grommet 68 are attached to a rear end portion of the inner housing 21. The rear shield 65 is a member that covers and shields a rear end portion of the connector 1, and includes, for example, a metal material or the like. The rear shield 65 is configured, for example, by being divided along the connection direction X, and is integrated by screwing a screw 651 and assembled to the rear end portion of the inner housing 21. A ring member 66 is attached to a rear end of the rear shield 65. The rear shield 65 functions as a part to which an end of a braided member as a shield member (not illustrated) that covers the electric wire W is caulked and conducted with the ring member 66 interposed therebetween. The grommet 68 is a cover member attached to the rear end of the rear shield 65. The grommet 68 is formed to be tapered toward a rear end, and is attached to cover a rear portion of the inner housing 21 and the rear shield 65. The grommet 68 is fastened and assembled to the inner housing 21 with a band member 67.

Figure 3:
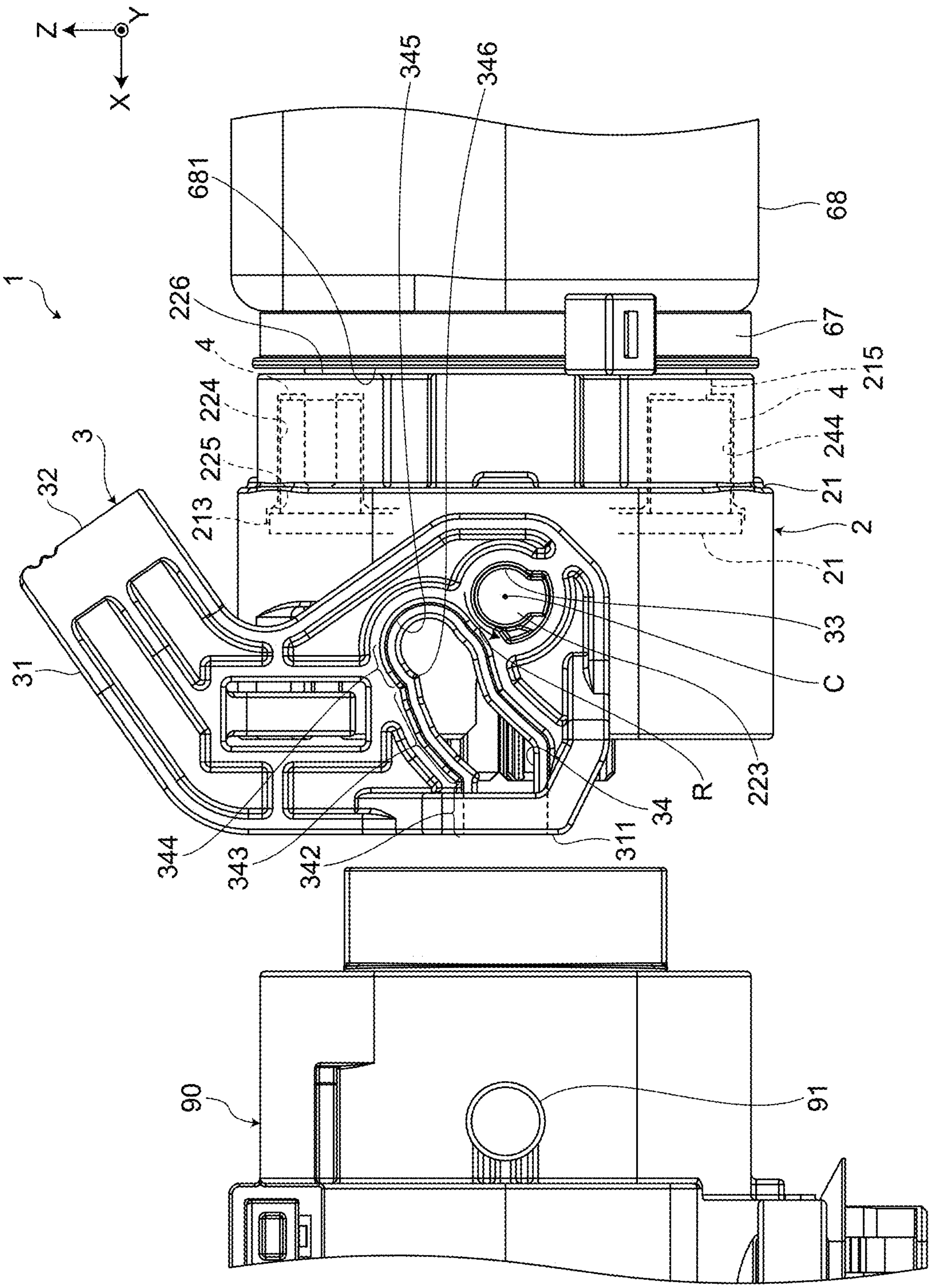
FIG. 3 is a side view of the connector according to the embodiment.

As illustrated in FIG. 3, the outer housing 22 is attached to the inner housing 21 so as to be movable along the connection direction X with the mating connector 90. The outer housing 22 has a cylindrical shape, is externally mounted on a body 215 of the inner housing 21, and is movable in the connection direction X. A movement range of the outer housing 22 is, for example, from a position where a facing surface 225 facing the flange 213 abuts on the flange 213 to a position where a rear end 226 abuts on a distal end portion 681 of the grommet 68.

As illustrated in FIG. 1, the lever 3 is rotatably attached to the housing 2. The lever 3 is a member that engages with the mating connector 90, fits the connector 1 and the mating connector 90, and holds the fitting. For example, the lever 3 includes an arm 31 and an operation unit 32, and is rotatably attached to the outer housing 22. The arm 31 is rotatably attached to a shaft member 223 formed on a side 222 of the outer housing 22. Two arms 31 are formed, and one arm is provided for each of the sides 222 on both sides so as to sandwich the outer housing 22. The arm 31 is provided with a hole 33 into which the shaft member 223 is inserted. The arm 31 is formed, for example, by being bent backward from a proximal position where the hole 33 is formed toward a distal position. Here, backward is a direction of the connector 1 opposite to the mating connector 90. The operation unit 32 is a part installed over distal ends of the arms 31 and 31, and extends along the width direction Y. The lever 3 has an inverted U shape by the two arms 31 and the operation unit 32, and is rotatable about a rotation center position C.

A cam groove 34 is formed in the lever 3. The cam groove 34 is a groove for inserting a cam follower 91 formed in the mating connector 90 and moving the connector 1 and the mating connector 90 in the fitting direction or a detachment direction by a rotation of the lever 3. Here, the fitting direction is a direction along the connection direction X, is a direction in which the mating connector 90 approaches the connector 1, and is a direction in which the mating connector 90 approaches the connector 1. The detachment direction is a direction opposite to the fitting direction, is a direction in which the connector 1 goes away from the mating connector 90, and is a direction in which the mating connector 90 goes away from the connector 1.

As illustrated in FIG. 3, the cam groove 34 is formed in the arm 31 so that a cam follower 91 can be inserted through the cam groove 34. For example, the cam follower 91 is formed as a columnar or cylindrical protrusion, and the cam groove 34 is a groove having a width larger than an outer diameter of the cam follower 91. The cam follower 91 has a structure in which the head 911 at a distal end is enlarged in diameter with respect to the body 912 and is hardly removed from the cam groove 34. That is, the cam groove 34 has a large width at a portion through which the head 911 of the cam follower 91 passes, and is a stepped groove. In such a structure, the cam follower 91 does not easily come out of the cam groove 34 when being inserted into the cam groove 34. The cam groove 34 is formed up to a facing surface 311 of the arm 31 facing the mating connector 90, and is formed so as to be along the connection direction X when the lever 3 is at a fitting start position as illustrated in FIG. 3. Therefore, when the connector 1 is fitted to the mating connector 90, the cam follower 91 is smoothly inserted into the cam groove 34.

Figure 4:
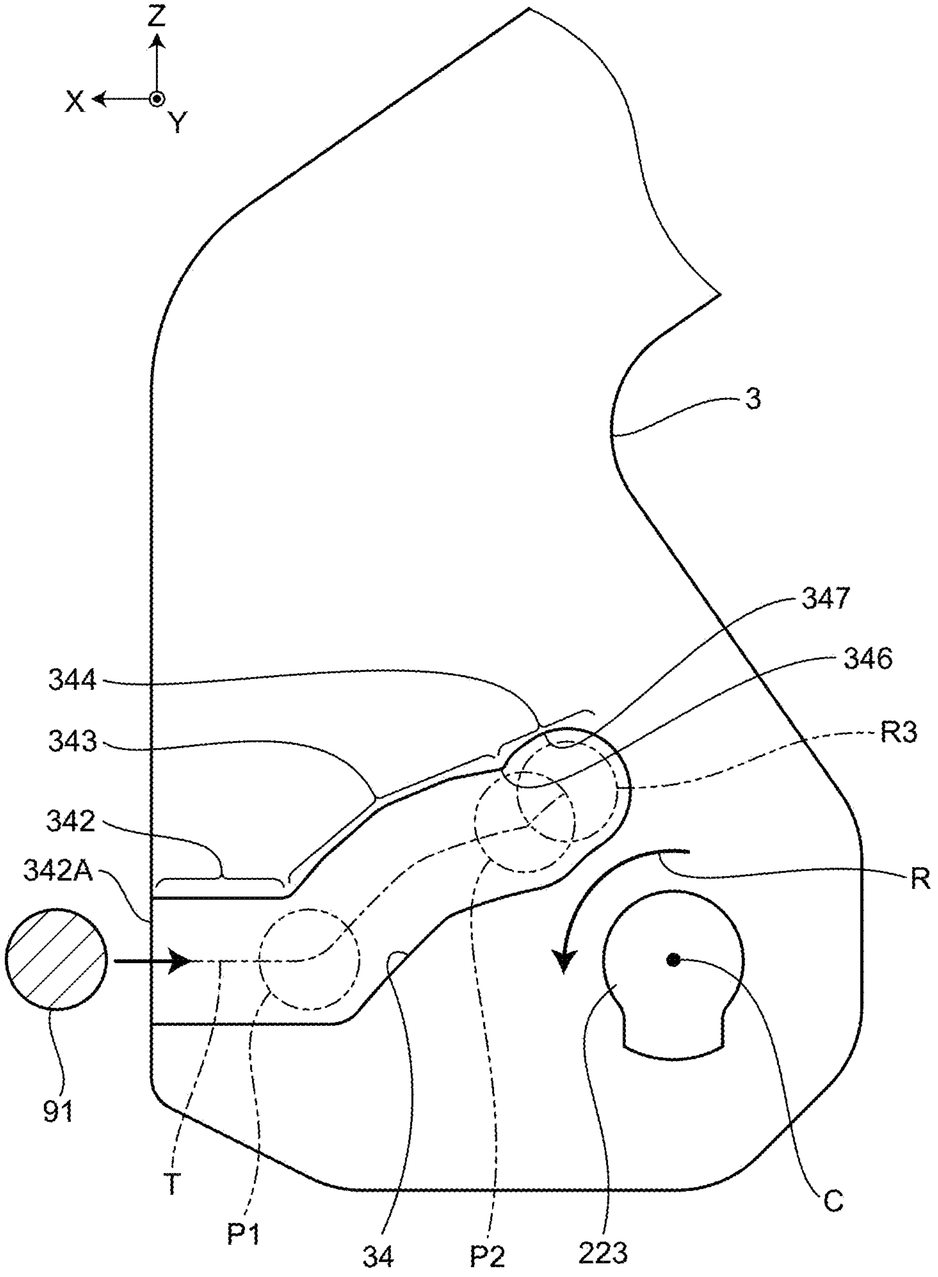
FIG. 4 is an explanatory diagram of a cam groove in the connector according to the embodiment.

As illustrated in FIG. 4, the cam groove 34 is formed closer to the mating connector 90 with respect to the rotation center position C in the arm 31, and extends obliquely with respect to a rotation direction R of the lever 3. That is, the cam groove 34 includes a half-fitting region 343 and a normal fitting region 344 which extend obliquely with respect to the rotation direction R of the lever 3. For example, the cam groove 34 is formed by connecting an inlet region 342, the half-fitting region 343, and the normal fitting region 344. The inlet region 342 is a region where the cam follower 91 starts to enter the cam groove 34, and has an insertion inlet position 342A. For example, when the lever 3 is at the fitting start position, the inlet region 342 has a linear shape along the connection direction X. The insertion inlet position 342A is the position of an inlet of the inlet region 342.

The half-fitting region 343 is a region where the cam follower 91 is located when the connector 1 and the mating connector 90 are in the half-fitting state, and is formed so as to approach the rotation center position C of the lever 3 from an inlet position P1 of the half-fitting region 343 toward a boundary position P2 with the normal fitting region 344. For example, when the cam follower 91 is at the inlet position P1, the lever 3 is rotated by fitting, the cam follower 91 thus approaches the rotation center position C of the lever 3, and a fitting degree between the connector 1 and the mating connector 90 is increased. Here, the rotation by fitting is rotation of the lever 3 for bringing the connector 1 and the mating connector 90 close to each other or fitting to each other. In FIG. 4, the rotation by fitting is a counterclockwise rotation of the lever 3. The rotation center position C is a center position of the shaft member 223 and is the position of a central axis.

The normal fitting region 344 is a region where the cam follower 91 is located when the connector 1 and the mating connector 90 are in a normal fitting state, and is formed so as to be away from the rotation center position C from the boundary position P2 with the half-fitting region 343 toward a fitting end position P3. For example, when the cam follower 91 is at the boundary position P2, the lever 3 is rotated by fitting, the cam follower 91 thus goes over a protrusion 346, enters the normal fitting region 344, and moves away from the rotation center position C of the lever 3. Then, the cam follower 91 moves to the fitting end position P3, and the connector 1 and the mating connector 90 are in the normal fitting state. The fitting end position P3 is a position on a depth side of the cam groove 34, and is a position where the cam follower 91 is located when the fitting between the connector 1 and the mating connector 90 ends. The cam groove 34 is bent at a boundary between the half-fitting region 343 and the normal fitting region 344, and the protrusion 346 is formed on a side surface of the cam groove 34. The protrusion 346 is formed on a side surface far from the rotation center position C among two side surfaces on both sides of the cam groove 34, and is formed so as to protrude toward the rotation center position C. In the normal fitting state of the connector 1 and the mating connector 90, the cam follower 91 is pressed from an inner surface 347 of the cam groove 34 to an opposite side of the mating connector 90 by the biasing of the spring unit 4 and is held at the fitting end position P3. As a result, the cam follower 91 is hardly detached from the normal fitting region 344, and the lever 3 is locked.

Figure 5:
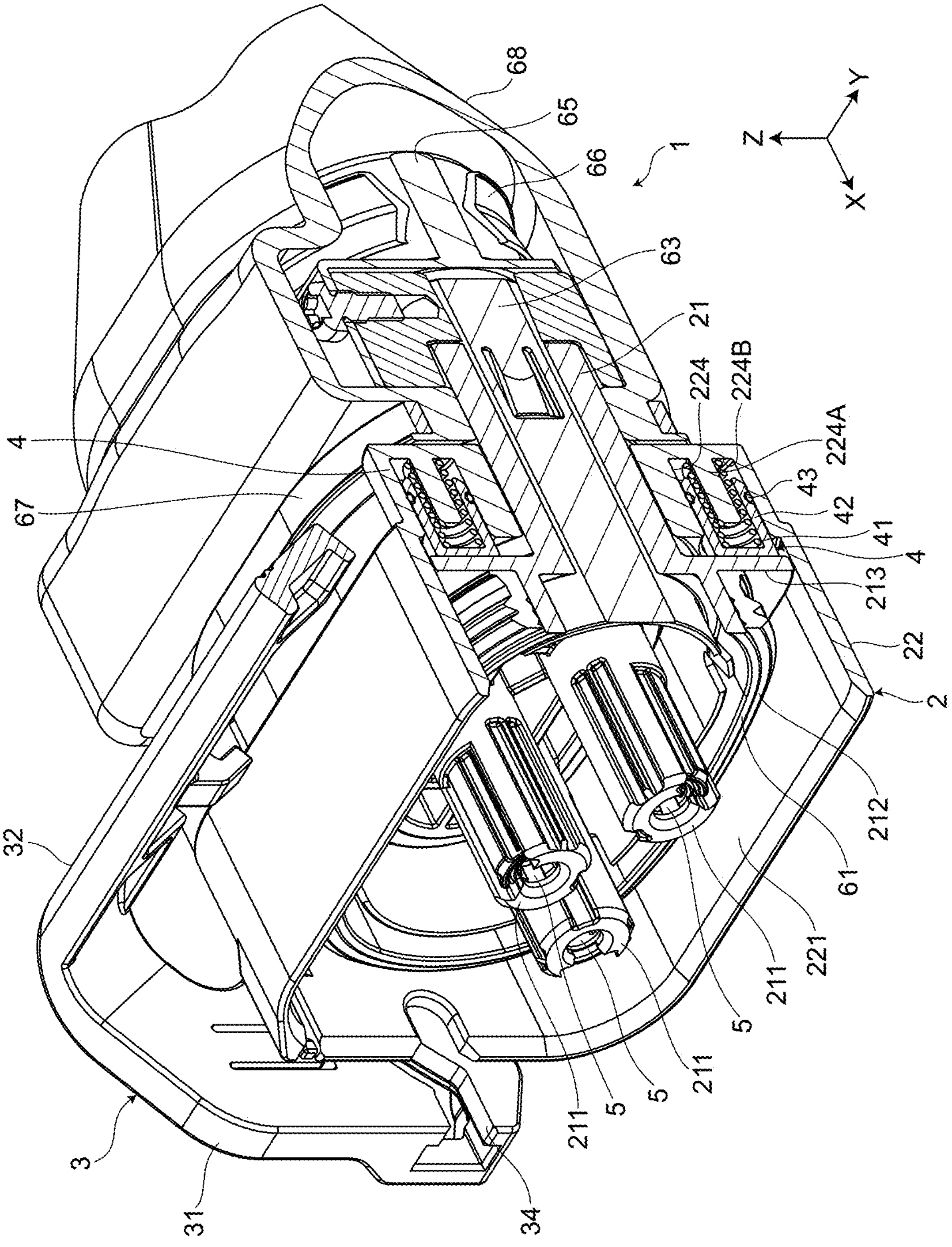
FIG. 5 is an explanatory diagram of a spring unit in the connector according to the embodiment.
Figure 6:
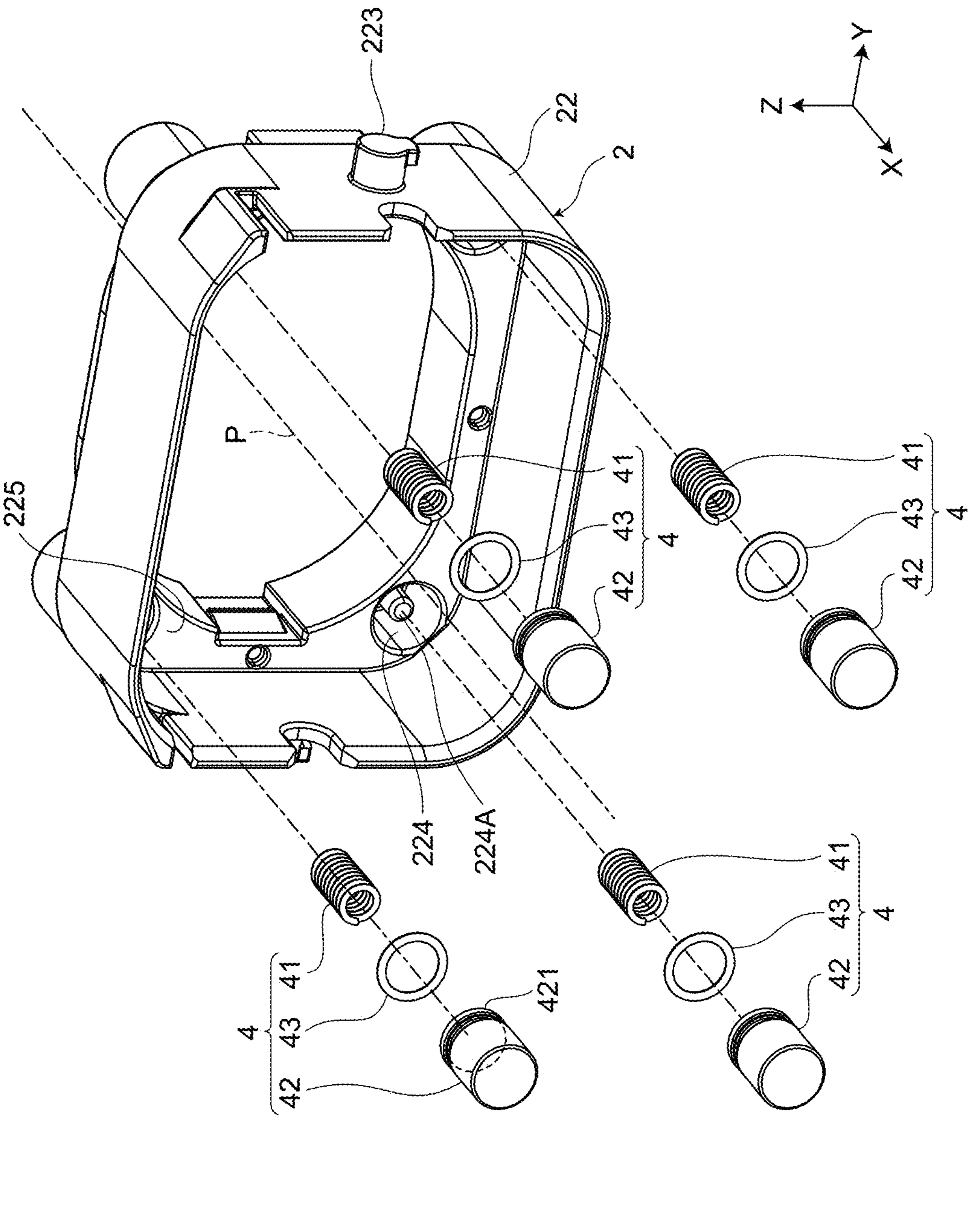
FIG. 6 is an exploded perspective view of the spring unit of the connector according to the embodiment.

As illustrated in FIGS. 5 and 6, the spring unit 4 is a biasing unit that is provided in the housing 2 and generates a biasing force along the connection direction X with the mating connector 90. FIG. 5 is a perspective view of the connector 1 for describing the spring unit 4, illustrating a cross section taken along line V-V in FIG. 1 with a part of the connector 1 cut away. The spring unit 4 is provided, for example, between the inner housing 21 and the outer housing 22 and applies a reaction force to the inner housing 21 to bias the outer housing 22 and the lever 3 to the opposite side of the mating connector 90. Specifically, the spring unit 4 is provided in an accommodation chamber 224 of the outer housing 22 and applies a reaction force to the flange 213 of the inner housing 21 to bias the outer housing 22 and the lever 3 in a direction opposite to the mating connector 90 (in FIG. 5, a direction obliquely upward to the right).

The spring unit 4 includes a spring 41, a spring cover 42, and a packing 43. The spring 41 is, for example, a coil spring, and generates a biasing force in an extending direction by being contracted. The spring 41 is accommodated in the accommodation chamber 224 formed in the outer housing 22. The accommodation chamber 224 is a hole having a circular cross section formed in a rear portion of the flange 213, and is formed so as to be recessed along the connection direction X from the facing surface 225 facing the flange 213, for example. That is, the accommodation chamber 224 is a space in which the entrance is opened and the back side is closed. The accommodation chamber 224 is provided with a rod-shaped shaft 224A at a center position. The shaft 224A is formed along the connection direction X from a bottom surface 224B on the back side. The spring 41 is externally mounted on the shaft 224A, and is disposed with the shaft 224A being inserted. The spring cover 42 is a cover that covers the spring 41, and is a cylindrical body that closes one end portion and opens the other end portion. The spring cover 42 is accommodated in the accommodation chamber 224 so as to cover the spring 41 with an open end portion 421 facing the back side of the accommodation chamber 224. Note that the spring cover 42 may be provided integrally with the flange 213. The packing 43 is a ring-shaped elastic member, and shuts off water between an outer periphery of the spring cover 42 and a content of the accommodation chamber 224. The packing 43 is attached to the outer periphery of the spring cover 42. As described above, since the spring 41 is accommodated in the accommodation chamber 224 and covered by the spring cover 42, water is prevented from entering an arrangement position of the spring 41. For example, even if water enters an installation position of the spring unit 4, since the spring 41 is covered by the spring cover 42 having a water shutoff function, the water is prevented from entering the installation position of the spring 41. The spring unit 4 is provided on the rear portion of the flange 213 and is structured not to contact the mating connector 90. In such a structure, water hardly enters the installation position of the spring unit 4.

A plurality of spring units 4 is provided at a predetermined distance from a center position P of the housing 2. The center position P is a position of a center axis along the connection direction X in the housing 2. For example, four spring units 4 are provided and installed at four corner positions of the outer housing 22 having a rectangular or substantially rectangular cross section intersecting the connection direction X. By providing the plurality of spring units 4 in this manner, the connector 1 can bias the outer housing 22 and the lever 3 along the connection direction X. The plurality of spring units 4 has the water shutoff function for each spring 41. Therefore, the connector 1 can ensure water shutoff performance for each spring 41. Note that, in a case where a plurality of spring units 4 is provided, the spring units 4 may be installed at positions or forms other than the positions and forms illustrated in FIG. 6.

Next, the connection of the connector 1 and the water shutoff function of the spring unit according to the present embodiment will be described.

As illustrated in FIG. 1, the connector 1 and the mating connector 90 are connected such that the connector 1 faces the mating connector 90. At this time, the lever 3 of the connector 1 is at the fitting start position in which the lever 3 is raised upward. As illustrated in FIG. 3, the position and orientation of the connector 1 are aligned with the mating connector 90, and the inlet region 342 of the cam groove 34 is aligned so as to face the cam follower 91 of the mating connector 90.

Figure 7:
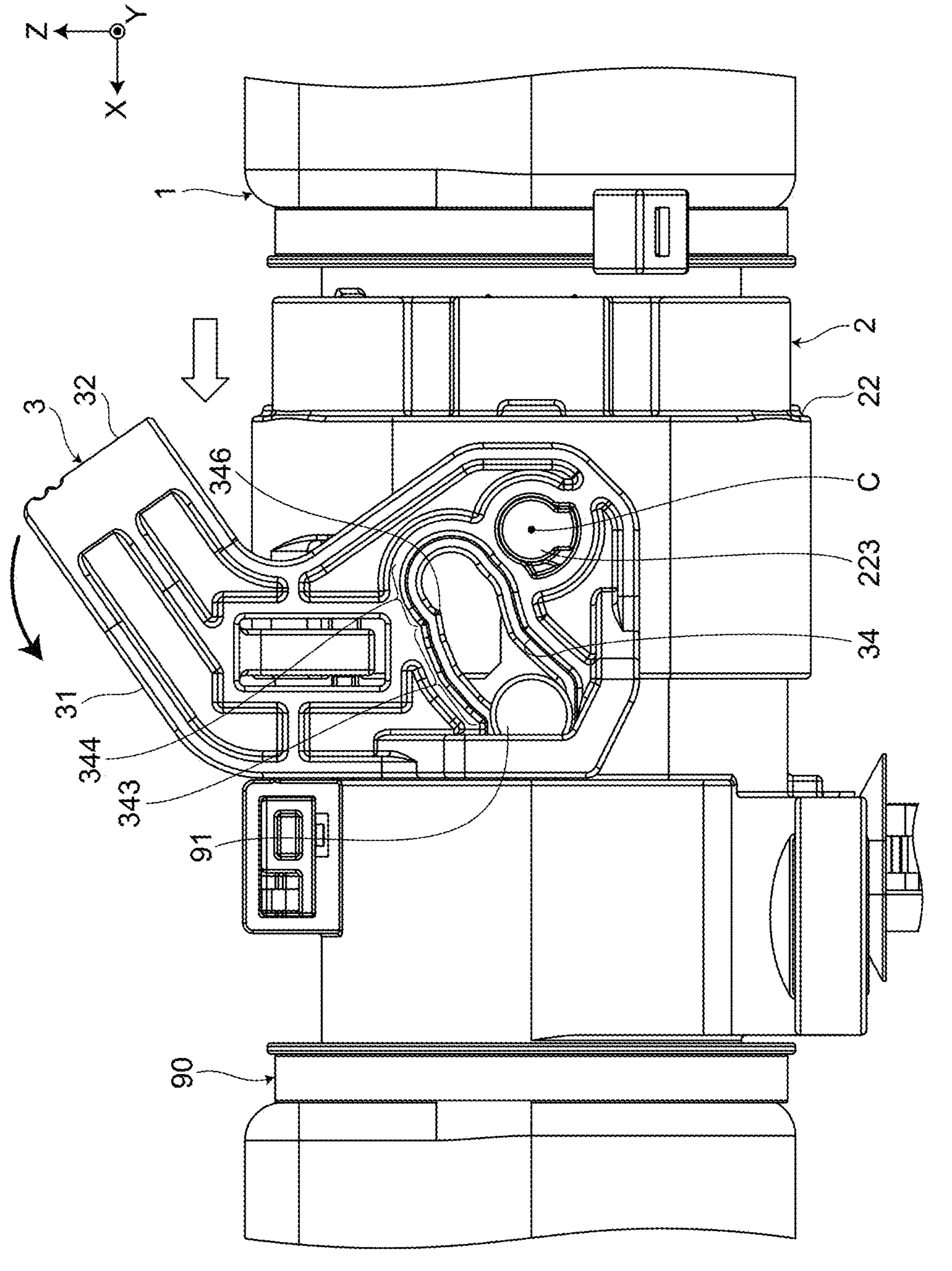
FIG. 7 is an explanatory diagram of connection in the connector according to the embodiment.

In this state, the connector 1 is brought close to the mating connector 90, and the cam follower 91 is inserted into the cam groove 34. Then, as illustrated in FIG. 7, when the cam follower 91 reaches the half-fitting region 343 of the cam groove 34, the lever 3 is rotated by fitting. That is, the lever 3 is rotated in the fitting direction (in FIG. 7, the counterclockwise direction). By the rotation of the lever 3, the cam follower 91 is moved in accordance with the shape of the cam groove 34, and the cam follower 91 approaches the rotation center position C of the lever 3. At this time, the cam follower 91 moves the half-fitting region 343 of the cam groove 34 toward the normal fitting region 344. As a result, the fitting degree of the connector 1 and the mating connector 90 progresses from the half-fitting state to the normal fitting state.

Figure 8:
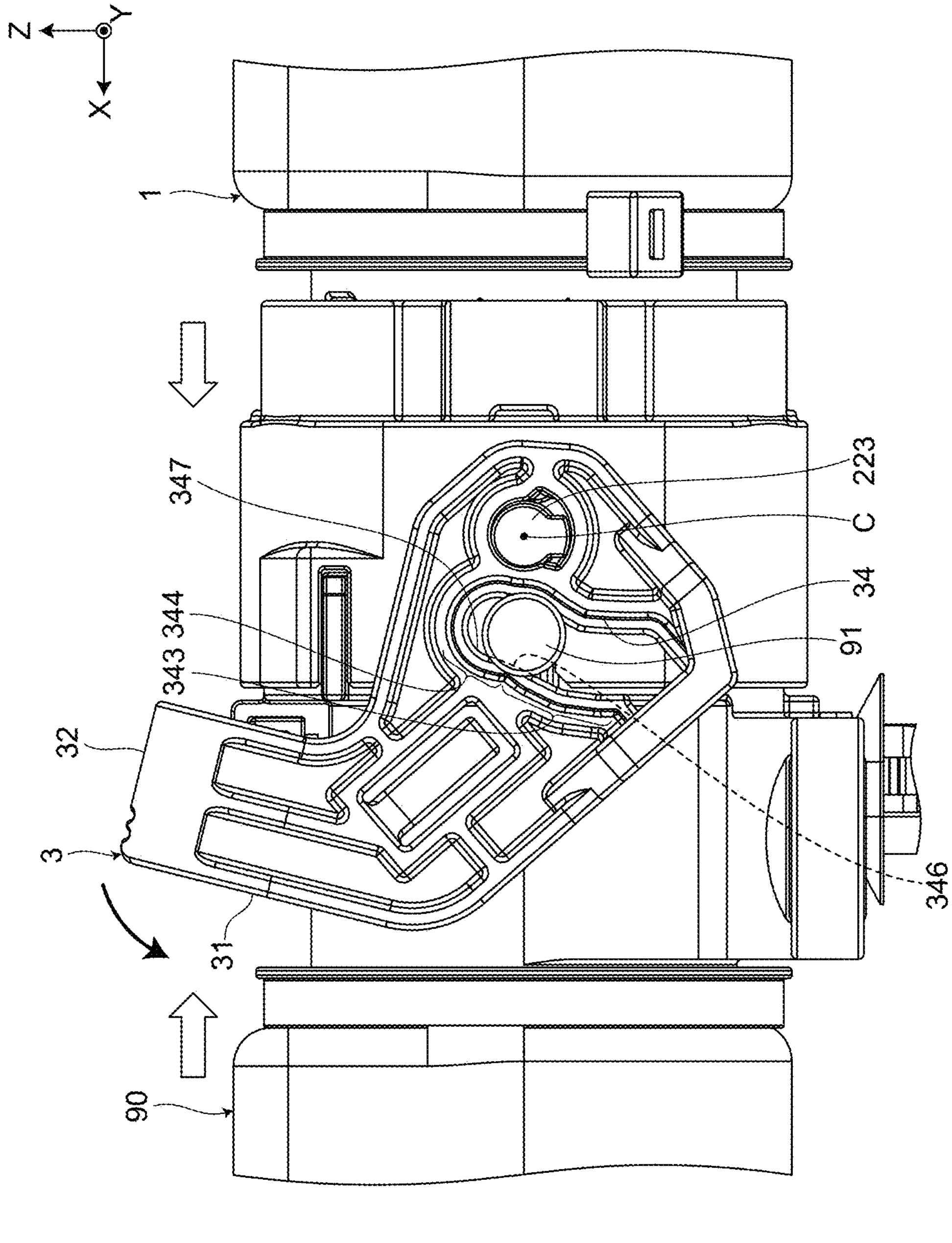
FIG. 8 is an explanatory diagram of the connection in the connector according to the embodiment.
Figure 9:
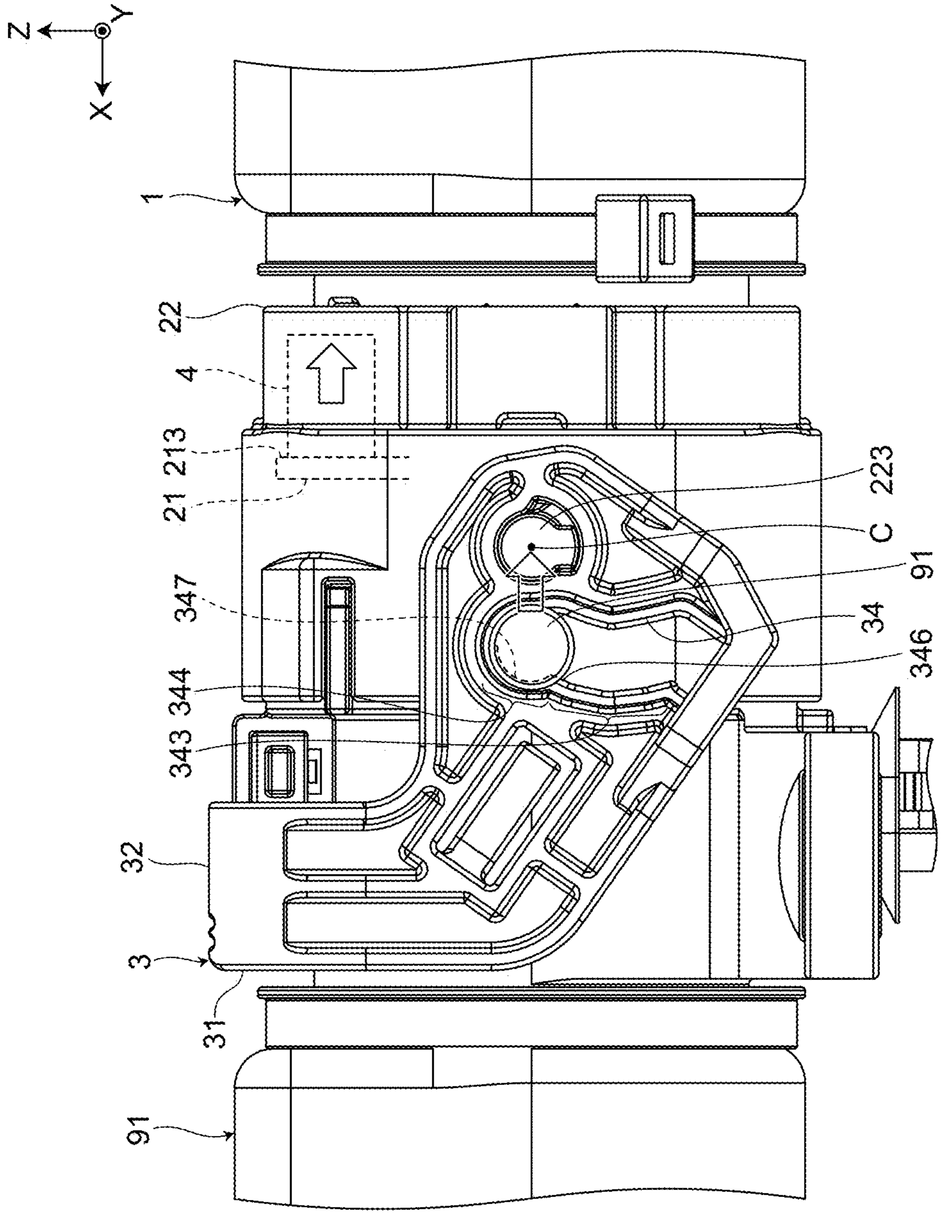
FIG. 9 is an explanatory diagram of the connection in the connector according to the embodiment.

Then, as illustrated in FIG. 8, when the lever 3 is rotated by fitting, the cam follower 91 approaches the rotation center position C of the lever 3, and reaches the boundary position between the half-fitting region 343 and the normal fitting region 344 of the cam groove 34. In this state, when the lever 3 is further rotated by fitting, as illustrated in FIG. 9, the cam follower 91 goes over the protrusion 346 and proceeds to the normal fitting region 344, and the lever 3 is located at a normal fitting position. As a result, the connector 1 and the mating connector 90 are switched from the half-fitting state to the normal fitting state, and are appropriately fitted and connected.

In this state, the cam follower 91 is hardly detached from the normal fitting region 344 by the biasing of the spring unit 4, the lever 3 is locked at the normal fitting position, and the connector 1 and the mating connector 90 are locked in a fitting state. That is, the spring unit 4 applies a reaction force to the inner housing 21 to bias the outer housing 22 and the lever 3 in the fitting direction (in FIG. 9, a direction to the right). Therefore, the cam follower 91 hardly moves from the normal fitting region 344 of the cam groove 34 to the half-fitting region 343, and the lever 3 is locked at the normal fitting position. In other words, in order to rotate the lever 3 from the normal fitting position in the detachment direction (in FIG. 9, a clockwise direction), it is necessary to rotate the lever 3 against the biasing force of the spring unit 4. In order to rotate the lever 3 from the normal fitting position in the detachment direction, it is necessary for the cam follower 91 to move over the protrusion 346 in the cam groove 34 to the half-fitting region 343, and a strong force is required. Therefore, the lever 3 is held at the normal fitting position by the biasing force of the spring unit 4.

At this time, the spring unit 4 is located at the rear portion of the flange 213. On the other hand, the connector 1 and the mating connector 90 are electrically connected at a position in front of the flange 213, and at the connection portion, water is shut off by the packing 61 and the packing 62, and an entry of water is prevented. However, in the connector 1, water is not shut off at the spring unit 4 by the packing 61 and the packing 62.

Meanwhile, the spring unit 4 individually has the water shutoff function. That is, in the spring unit 4, the spring 41 is covered with the spring cover 42, and entry of water into the spring cover 42 is suppressed by the packing 43. Therefore, the connector 1 can suppress entry of water into the installation position of the spring 41 in the spring cover 42. Therefore, the connector 1 can prevent the spring 41 from being corroded by water and prevent the biasing force from being reduced.

As described above, in the connector 1 according to the present embodiment, the spring 41 is covered with the spring cover 42 to block contact between the spring 41 and water, and the packing 43 suppresses the entry of water into the installation position of the spring 41. Therefore, the connector 1 according to the present embodiment can improve the water shutoff performance for the spring 41.

When the spring unit 4 is provided between the inner housing 21 and the outer housing 22, the connector 1 according to the present embodiment, which has the water shutoff function for the spring 41, can still reliably prevent water from entering the installation position of the spring 41.

In the connector 1 according to the present embodiment, when a plurality of spring units 4 is installed at a predetermined distance from the center position P of the housing 2, the spring units 4 still individually have the water shutoff function for the spring 41. Therefore, the connector 1 according to the present embodiment can reliably suppress water from entering the installation position of the spring 41.

Note that the connector according to the present invention is not limited to the embodiment described above, and various modifications can be made within the scope described in the claims. The connector 1 according to the present embodiment may be configured by appropriately combining the constituent elements of each embodiment and modification described above.

For example, although a case where the connector 1 according to the embodiment described above is mounted on a vehicle has been described, the connector 1 may be used without being mounted on a vehicle.

In the embodiment described above, the connector 1 in which the spring unit 4 applies a reaction force to the inner housing 21 to bias the outer housing 22 and the lever 3 to the opposite side of the mating connector 90 has been described. However, the spring unit 4 may be a connector that biases a member other than the outer housing 22 and the lever 3. For example, the spring unit 4 of the connector may bias the mating connector 90 in a direction of separating the mating connector 90 away from the connector. Such a connector can also improve the water shutoff performance for the spring 41 as in the embodiment described above.

For example, although the connector 1 includes the lever 3 in the embodiment described above, the connector 1 is not required to include the lever 3 as long as the connector 1 includes the spring unit 4. Such a connector can also improve the water shutoff performance for the spring 41 as in the embodiment described above.

The connector of the present embodiment can improve water shutoff performance for a spring unit provided in a housing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a housing that is fitted to a mating connector; and a spring unit that is provided in the housing and generates a biasing force along a connection direction with the mating connector, wherein the spring unit includes a spring formed along the connection direction and accommodated in an accommodation chamber with an inlet opened and a back side closed, a spring cover that has a cylindrical shape with one end opened and another end closed, and is accommodated in the accommodation chamber so as to cover the spring with an open end portion facing the back side of the accommodation chamber, and a packing that is attached to an outer periphery of the spring cover and shuts off water between the spring cover and the accommodation chamber.

2. The connector according to claim 1, wherein the housing includes an inner housing that holds a terminal, an outer housing provided outside the inner housing, and a lever that is rotatably attached and engages with the mating connector, the outer housing is attached to the inner housing so as to be movable along the connection direction with the mating connector, and the spring unit is provided between the inner housing and the outer housing and applies a reaction force to the inner housing to bias the outer housing and the lever to an opposite side of the mating connector.

3. The connector according to claim 1, wherein a plurality of the spring units is provided at a predetermined distance from a center position of the housing.

4. The connector according to claim 2, wherein a plurality of the spring units is provided at a predetermined distance from a center position of the housing.

* * * * *